United States Patent [19]

Murata et al.

[11] Patent Number: 5,447,759
[45] Date of Patent: Sep. 5, 1995

[54] LIQUID CRYSTAL ALIGNMENT FILM AND LIQUID CRYSTAL DISPLAY ELEMENT

[75] Inventors: Shizuo Murata; Masaharu Hayakawa; Yukino Abe, all of Chiba, Japan

[73] Assignee: Chisso Corporation, Osaka, Japan

[21] Appl. No.: 245,630

[22] Filed: May 18, 1994

[30] Foreign Application Priority Data

May 18, 1993 [JP] Japan .................... 5-115822

[51] Int. Cl.⁶ .......................... G02F 1/1337
[52] U.S. Cl. ..................... 428/1; 428/473.5; 359/75
[58] Field of Search ............. 428/1, 473.5; 359/75, 359/77, 78, 76

[56] References Cited

FOREIGN PATENT DOCUMENTS 1-245224  9/1989  Japan .
5-249463  9/1993  Japan .

*Primary Examiner*—Alexander S. Thomas
*Attorney, Agent, or Firm*—Wenderoth, Lind & Ponack

[57] ABSTRACT

A liquid crystal alignment film and a liquid crystal display element are provided, according to which a phenomenon of afterimage is slight in the case of liquid crystal display elements of TN mode or STN mode, while a problem of printing phenomenon is solved and a good memory characteristic is obtained in the case of ferroelectric liquid crystal display elements, the liquid crystal alignment film and the liquid crystal display element being characterized in that at least one kind of compounds expressed by the following formula (2) or (3) is added into a liquid crystal alignment film consisting of a polyimide expressed by the following formula (1):

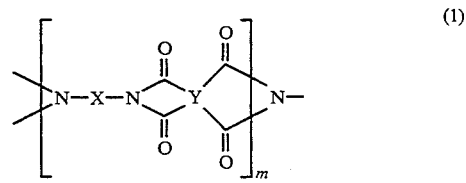

(1)

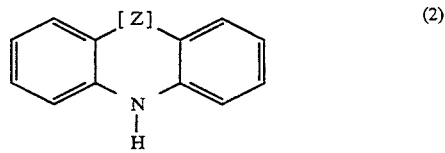

(2)

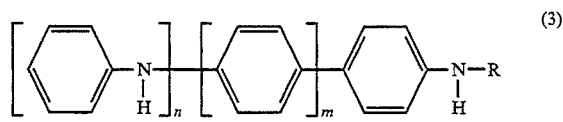

(3)

10 Claims, 2 Drawing Sheets

LIQUID CRYSTAL ALIGNMENT FILM AND LIQUID CRYSTAL DISPLAY ELEMENT

BACKGROUND OF THE INVENTION

1. Field of the Invention

This invention relates to an improved liquid crystal alignment film and a liquid crystal display element using the same.

2. Description of the Related Art

As liquid crystal display elements currently used, there have been known a product utilizing a twisted nematic (hereinafter abbreviated to TN) mode, i.e. having a structure wherein the aligning direction of nematic liquid crystal molecules is twisted by 90° between a pair of two upper and lower electrode substrates, a product utilizing a supertwisted nematic (hereinafter abbreviated to STN) mode, utilizing a birefringent effect, i.e. having a structure wherein the aligning direction of nematic liquid crystal molecules is twisted by 180° to 300°, a product utilizing a ferroelectric liquid crystal substance or an antiferroelectric liquid crystal substance, etc.

Problems common in all of these modes are as follows:

When the same picture is displayed for a long time, followed by alternating it to another picture, then the previous picture remains as an afterimage or the afterimage is retained for a long time, to cause a phenomenon of remaining a stationary image, so that the display quality of the resulting liquid crystal display element is notably damaged. The cause of occurrence of these phenomena has been regarded as being brought about by the fact that an electric double layer is formed on the interface between the alignment film of the liquid crystal display element and the liquid crystal substance, thereby a charge accumulated is stably retained.

Further, in the case of ferroelectric liquid crystal display elements, it has been said that when liquid crystal molecules transfer from one state to another of the bistable state, a reverse electric field occurs on the interface between the liquid crystals and the alignment film and the bistability is damaged by the influence of the reverse electric field, thereby losing the memory properties.

In general, as the alignment film used for liquid crystal display elements, organic films of derivatives of polyimides, polyamides, etc. have been mainly used. For example, Japanese patent application laid-open No. Sho 51-65960 discloses a liquid crystal display element provided with a liquid crystal alignment film using a polyimide having repetition units expressed by the formula

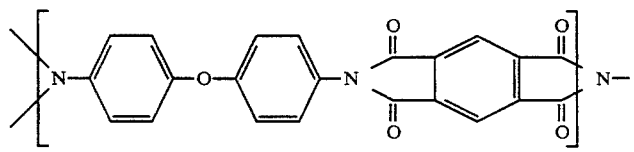

However, in the case of the liquid crystal display element using such a liquid crystal alignment film, there has been raised a problem that an afterimage and a stationary image occurs.

The object of the present invention is to provide a liquid crystal alignment film and a liquid crystal display element which is few in causing the afterimage or the stationary image phenomena in the case of TN mode or STN mode liquid crystal display elements and solve the problem of the printing phenomenon and afford a superior memory characteristic in the case of a ferroelectric liquid crystal display elements.

SUMMARY OF THE INVENTION

The present inventors have noted the phenomenon of the electric charge accumulation formed on the interface between the alignment film and the liquid crystal substance, and have made extensive research and as a result, have found that it is effective for solving the above problems of the prior art to add at least one compound selected from compounds expressed by the formula (2) or (3) mentioned below into a liquid crystal alignment film composed of a polyimide expressed by the formula (1) mentioned below.

The present invention has the following aspects 1) to 10):

1) A liquid crystal alignment film composed of a polyimide expressed by the following formula (1) and coated onto substrate(s) provided with a transparent electrode, which film contains at least one compound expressed by the following formula (2) or (3) in a quantity of 0.01 to 20% by weight based upon the weight of the polyimide:

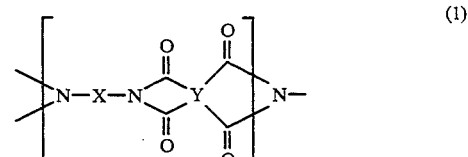

(1)

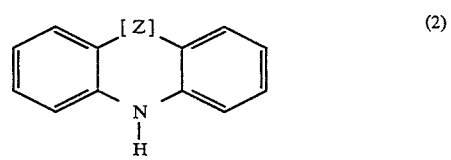

(2)

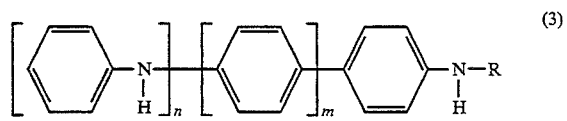

(3)

in the above formulas, X represents a divalent aromatic group or a divalent aliphatic group; Y represents a tetravalent aromatic group or alicyclic group; Z represents —S—, —O— or =NH; R represents a phenyl group, a benzyl group or an alkyl group; and m and n each represent 0 or 1.

2) A liquid crystal alignment film according to item 1), wherein the polyimide is the one obtained by coating a polyamic acid containing at least one compound expressed by the formula (2) or (3) in a quantity of 0.01 to 20% by weight based upon the weight of polyimide onto substrate(s) provided with a transparent electrode, followed by heating the resulting material.

3) A liquid crystal alignment film according to item 1), wherein the polyimide of the formula (I) is the one obtained by coating a soluble polyimide solution containing at least one compound expressed by the formula (2) or (3) in a quantity of 0.01 to 20% by weight based upon the weight of the polyimide onto substrate(s) provided with a transparent electrode, followed by heating the resulting material.

4) A liquid crystal alignment film according to item 1), wherein at least one compound expressed by the formula (2) or (3) is copolymerized within the polyimide of the formula (I) in a quantity of 0.01 to 20% by weight based upon the weight of the polyimide.

5) A liquid crystal alignment film according to any one of the items 1) to 4), wherein the compound expressed by the formula (2) is phenothiazine, phenoxazine or 5,10-dihydrophenazine.

6) A liquid crystal alignment film according to any one of items 1) to 4), wherein the compound expressed by the formula (3) is diphenylbenzidine, diphenylamine, N-phenyl-phenylenediamine or phenylbenzylamine.

7) A liquid crystal display element using a liquid crystal alignment film according to item 1).

8) A liquid crystal display element according to item 7), wherein the liquid crystal material used therein is a nematic liquid crystal mixture having a positive dielectric anisotropy.

9) A liquid display element according to item 7), wherein the liquid crystal material used herein is a ferroelectric liquid crystal mixture.

10) A liquid crystal display element according to item 9), wherein the ferroelectric liquid crystal mixture has a spontaneous polarization value of 3 to 40 nC/cm$^2$.

BRIEF DESCRIPTION OF THE ACCOMPANYING DRAWINGS

DESCRIPTION OF PREFERRED EMBODIMENTS

Figure 1:
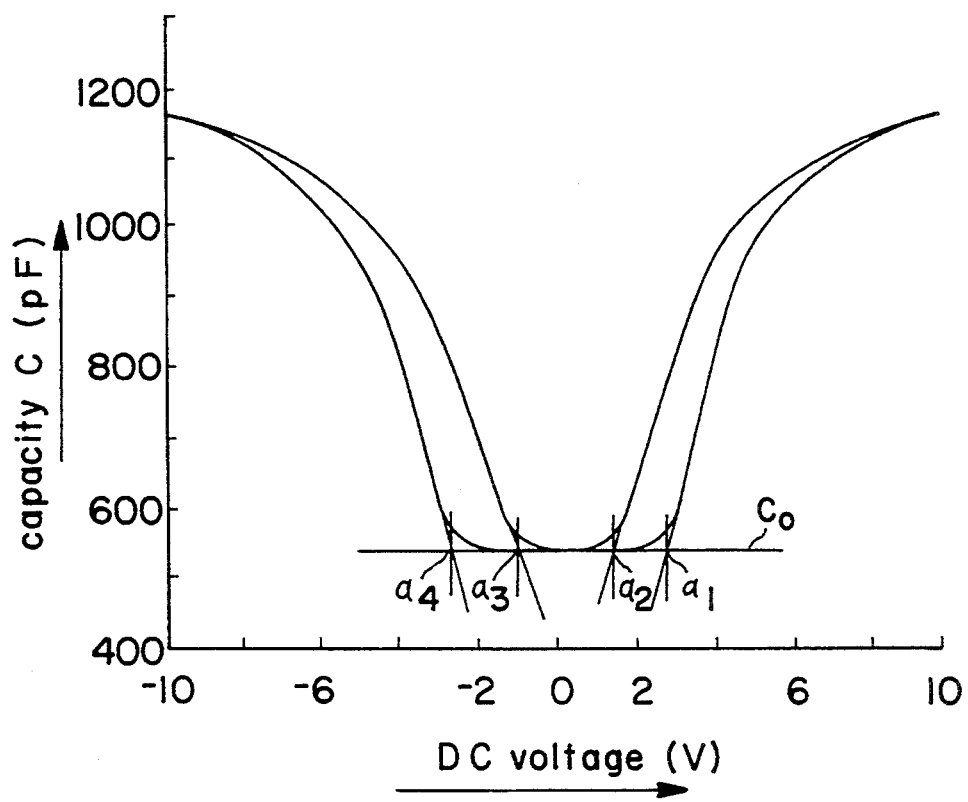
FIG. 1 shows a view illustrating a C-V curve of liquid crystal cell.

Polyimides expressed by the formula (1) are generally obtained by subjecting polyamic acids obtained by condensing diamino compounds with tetracarboxylic dianhydrides, to dehydration and ring closure to form imide bonds.

Concrete examples of diamino compounds used as the raw material are as follows:

1,1-bis[4-(4-aminophenoxy)phenyl]cyclohexane
1,1-bis[4-(4-aminophenoxy)phenyl]-4-methylcyclohexane
1,1-bis[4-(4-aminophenoxy)phenyl]-4-ethylcyclohexane
1,1-bis[4-(4-aminophenoxy)phenyl]-4-n-propylocyclohexane
1,1-bis[4-(4-aminophenoxy)phenyl]-4-n-butylcyclohexane
1,1-bis[4-(4-aminophenoxy)phenyl]-4-n-pentylcyclohexane
1,1-bis[4-(4-aminophenoxy)phenyl]-4-n-hexylcyclohexane
1,1-bis[4-(4-aminophenoxy)phenyl]-4-n-heptylcyclohexane
1,1-bis[4-(4-aminophenoxy)phenyl]-4-n-octylcclohexane
2,2-bis[4-(4-aminophenoxy)phenyl]propane
2,2-bis[4-(4-aminophenoxy)phenyl]butane
2,2-[4-(4-aminophenoxy)phenyl]pentane
2,2-bis[4-(4-aminophenoxy)phenyl]hexane
2,2-bis[4-(4-aminophenoxy)phenyl]heptane
2,2-bis[4-(4-aminophenoxy)phenyl]octane
2,2-bis [4-(4-aminophenoxy)phenyl]nonane
2,2-bis[4-(4-aminophenoxy)phenyl]decane
2,2-bis[4-(4-aminophenoxy)phenyl]dodecane
1,1-bis[4-(4-aminobenzyl)phenyl]cyclohexane
1,1-bis[4-(4-aminobenzyl)phenyl]-4-methylcyclohexane
1,1-bis[4-(4-aminobenzyl)phenyl]-4-ethylcyclohexane
1,1-bis[4-(4-aminobenzyl)phenyl]-4-n-propylcyclohexane
1,1-bis[4-(4-aminobenzyl)phenyl]-4-n-butylcyclohexane
1,1-bis[4-(4-aminobenzyl)phenyl]-4-n-pentylcyclohexane
1,1-bis[4-(4-aminobenzyl)phenyl]-4-n-hexylcyclohexane
1,1-bis[4-(4-aminobenzyl)phenyl]-4-n-heptylcyclohexane
1,1-bis[4-(4-aminobenzyl)phenyl]-4-n-octylcyclohexane
1,1-bis[4-(4-aminobenzyl)phenyl]methane
4,4'-diaminophenylether, 4,4'-diaminodiphenylmethane,
4,4'-diaminodiphenylsulfone, 4,4'-diaminodiphenylsulfide,
4,4'-di(meta-aminophenoxy)diphenylsulfone,
4,4'-di(para-aminophenoxy)diphenylsulfone,
ortho-phenylenediamine, meta-O-phenylenediamine, paraphenylenediamine, benzidine, 2,2'-diaminobenzophenone, 4,4'-diaminobenzophenone, 4,4'-diaminodiphenyl-2,2'-propane, 1,5-diaminonaphthalene, 1,8-diaminonaphthalene, aromatic diamino compounds, such as 2,2'-bis[4-(4-aminophenoxy)phenyl]-hexamethylpropane, alicyclic diamino compounds, such as 1,4-diaminocyclohexane, 4,4'-diaminodicyclohexylmethane.

The diamino compounds used in the present invention are not limited to the above-mentioned compounds, and it is possible to use combinations of two or more kinds of the above mentioned compounds.

In order to improve an adhesiveness of the liquid crystal alignment film to the substrate, the above-mentioned diamino compounds can be partly replaced by aminosilicon compounds or diaminosilicon compounds.

Concrete examples of aminosilicon compounds are as follows:

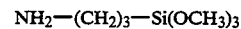

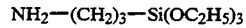

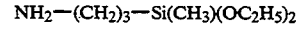

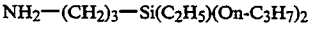

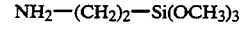

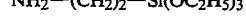

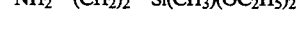

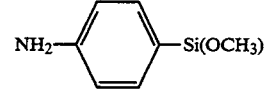

-continued

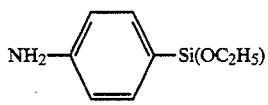

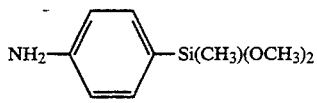

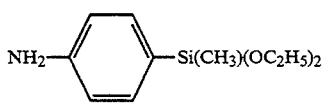

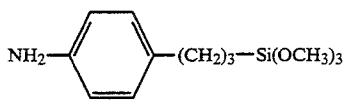

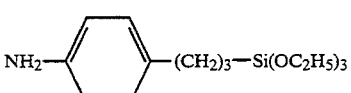

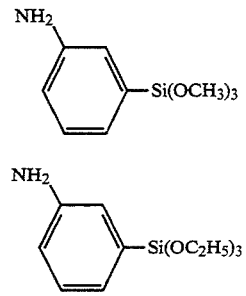

Further, examples of the diaminosilicon compound are as follows:

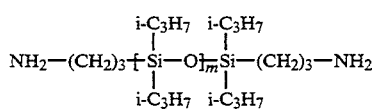

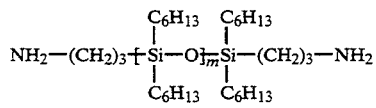

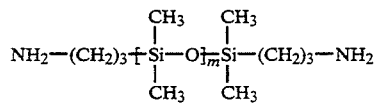

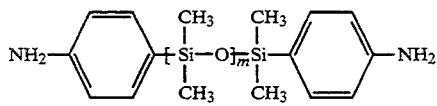

When these aminosilicon compounds or diaminosilicon compounds are introduced into the polyimides, the content thereof (in terms of the total quantity) is 50% by mol or less, preferably 30% by mol or less, based upon the mols of the diamino compounds.

Concrete examples of the aromatic tetracarboxylic dianhydrides used for preparation of the above polyimides are as follows:

pyromellitic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 3,3',4,4'-benzophenonetetracarboxylic dianhydride, 2,2',3,3'-benzophenonetetracarboxylic dianhydride, bis(3,4-dicarboxyphenyl)ether dianhydride, bis(3,4-dicarboxyphenyl)sulfone dianhydride, 1,2,5,6-naphthalenetetracarboxylic dianhydride, 2,3,6,7-naphthalenetetracarboxylic dianhydride, etc.

Further, examples of the alicyclic tetracarboxylic dianhydride are as follows:

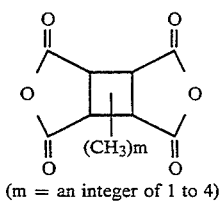

(m = an integer of 1 to 4)

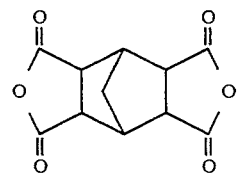

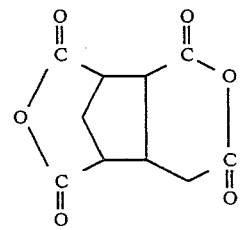

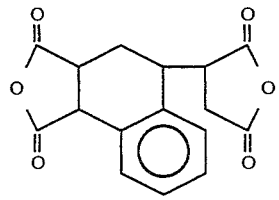

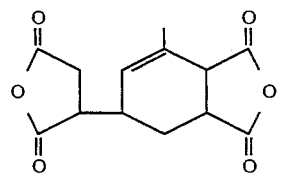

These compounds may include isomers, and may be used as a mixture thereof.

A process for obtaining the polyimide film includes a process of dissolving a polyamic acid obtained by condensation of a diamino compound with a tetracarboxylic dianhydride in a solvent such as N-methyl-2-pyrrolidone (NMP), dimethylacetamide (DMAc), dimethylformamide (DMF), dimethylsulfoxide (DMSO) or the like, followed by coating the solution onto a substrate according to brushing method, immersion method, rotational coating method, spraying method, printing method or the like, and heat-treating at 100° to 450° C., preferably 150° to 300° C. to effect dehydration-ring closure reaction and thus form an imide bond, thereby obtaining a polyimide in the form of a thin film, or a process of subjecting a polyamic acid obtained by condensation of a diamino compound with a tetracarboxylic dianhydride to heat treatment or chemical treatment, to obtain a soluble polyimide in advance, followed by dissolving the polyimide in a solvent such as NMP, DMAc, DMF, DMSO, ν-butyrolactone, etc., coating the resulting solution onto a substrate and vaporizing the solvent to obtain a thin film polyimide.

In the alignment film of the present invention, concrete examples of the compound of the formula (2) added to the polyimide are as follows:

phenoxazine, phenothiazine, 5,10-dihydrophenazine, etc.

In the alignment film of the present invention, concrete examples of the compound of the formula (3) added to the polyimide are as follows:

diphenylamine, N-phenylphenylenediamine, N,N'-diphenylbenzidine, phenylbenzylamine, N,N'-diphenylphenylenediamine, p-aminodiphenylamine, etc.

The process of adding the compound expressed by the formula (2) or (3) to the polyimide includes (i) a process of adding the compound to a polyamic acid, followed by heat-baking to obtain the polyimide film, and (ii) a process of adding the compound to a soluble polyimide, followed by removing the solvent to obtain the polyimide film. In either process, a case where the compound expressed by the formula (2) or (3) is copolymerized within the polyimide skelton may be considered, but this has no influence upon the effect of the present invention.

The process of providing the liquid crystal alignment film on a substrate will be concretely described.

In the case where the polyamic acid is used, the polyamic acid obtained by condensation of a diamino compound with a tetracarboxylic dianhydride is dissolved in a solvent such as N-methyl-pyrrolidone (NMP), dimethylacetamide (DMAc), dimethylformamide (DMF), dimethylsulfoxide (DMSO), butyl cellosolve, ethylcarbitol, ν-butyrolactone, etc., to prepare a 0.1 to 30by weight solution, followed by adding a compound of the formula (2) or (3) in a quantity of 0.1 to 20% by weight based upon the weight of the polyimide, coating this solution onto a substrate according to brushing process, immersion process, rotational coating process, spraying process, printing process or the like, to form a coating, subjecting the coating to heat treatment at 150° to 450° C., preferably 150° to 300° C. to effect dehydration-ring closure reaction to form imide bonds, thereby obtaining a polyimide in the form of a thin film.

Further, in the case where a soluble polyimide is used, a polyamic acid obtained by condensation of a diamino compound with a tetracarboxylic dianhydride is subjected to heat treatment or chemical treatment to prepare a soluble polyimide in advance, followed by dissolving the resulting substance in a solvent such as NMP, DMAc, DMF, DMSO, ν-butyrolactone or the like, to prepare a 0.1 to 30% by weight solution, adding a compound of the formula (2) or (3) in a quantity of 0.1 to 20% by weight based upon the weight of the polyimide, coating the resulting solution onto substrate(s) provided with a transparent electrode and vaporizing the solvent, to obtain a polyimide in the form of a thin film.

By subjecting the polyimide film to uniaxially rubbing treatment, it is possible to prepare a liquid crystal alignment film capable of aligning liquid crystal substances.

The liquid crystal display element of the present invention is composed of an electrode substrate having a liquid crystal alignment film of the present invention, a voltage-impressing means and a liquid crystal material.

Figure 3:
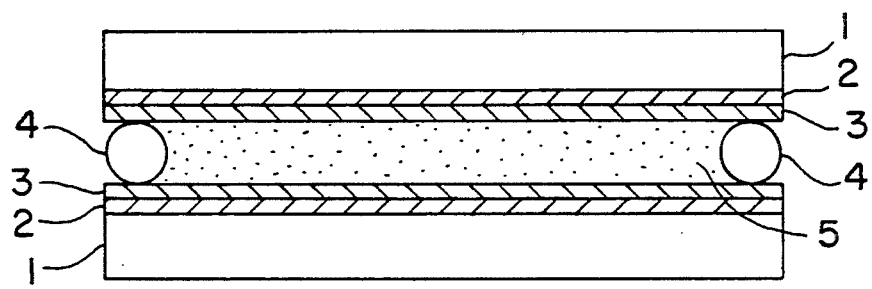
FIG. 3 shows a cross-sectional view of a general liquid crystal display cell.

FIG. 3 illustrates a typical liquid crystal display element, and the electrode substrate is composed of a material obtained by forming a transparent electrode 2 of ITO (indium oxide-tin oxide) or tin oxide on a glass substrate 1, and a liquid crystal alignment film 3 is formed thereon. A spacer concurrently with a sealing resin 4 is intervened between a pair of electrodes 2, having each coated film 3 and a liquid crystal 5 is sealed therebetween, to construct a liquid crystal display element. Between the transparent electrode 2 and the glass substrate 1 may be formed an undercoat film such as an insulating film for preventing dissolution out of an alkali from the glass substrate 1, a color filter, a color filter overcoat, etc.

Further, active elements such as TFT, a non-linear resistant element, etc. may also be formed.

As these electrodes, undercoats, overcoats and other constituents in the cell, conventional constituents for liquid crystal display elements are usable.

Using the thus formed electrode substrate, a liquid crystal display cell is prepared, and a liquid crystal substance is filled in the space of the cell, to prepare a liquid crystal display element in combination with a voltage-impressing means. As liquid crystal substances used for liquid crystal display elements, nematic liquid crystal substances, ferroelectric liquid crystal substances, etc. are usable.

Examples of the nematic liquid crystal substances used for the liquid crystal display element of the present invention are as follows: (A) compounds having a high dielectric anisotropy value of $\Delta\epsilon \geq 5$, (B) compounds having a low dielectric anisotropy value of $|\Delta\epsilon| < 5$, (C) compounds having a clearing point exceeding 80° C., and (D) other compounds.

The liquid crystal compounds substances may be selected from among the above (A) to (D), mixed and used for depending upon the properties required for the liquid crystal display element, while adjusting the threshold voltage, viscosity, mesomorphic range, etc.

Compounds belonging the above (A) to (D) will be illustrated below, but the present invention should not be construed to be limited thereto. In the following formulas, R and R' each independently represent an alkyl group of 1 to 8 carbon atoms, an alkenyl group of 2 to 8 carbon atoms, an alkoxy group of 1 to 8 carbon atoms or an alkoxy alkyl group of 1 to 8 carbon atoms:

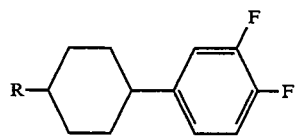 (A1)

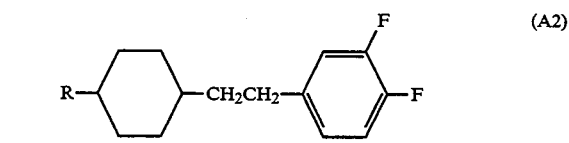 (A2)

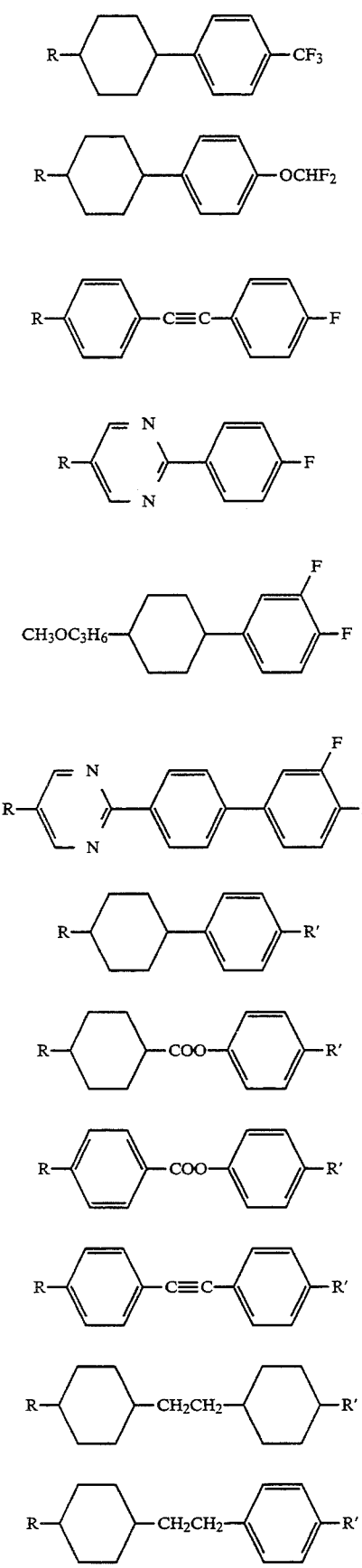

-continued
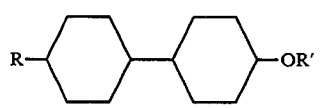 (B14)
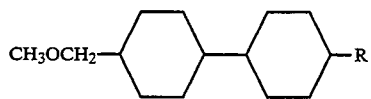 (B15)
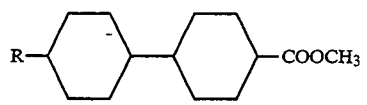 (B16)
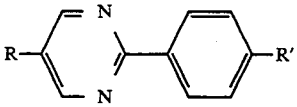 (B17)
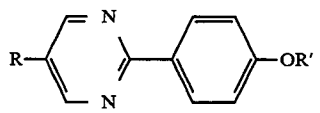 (B18)
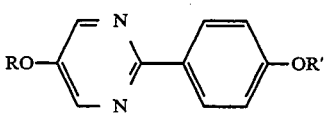 (B19)
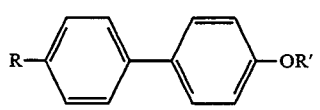 (B20)
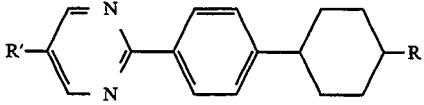 (B21)
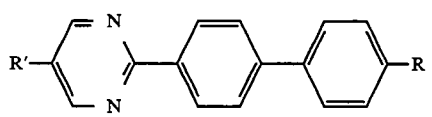 (B22)
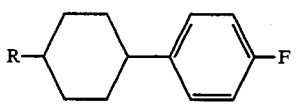 (B23)
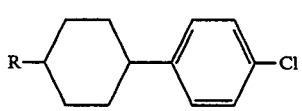 (B24)
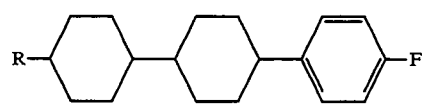 (C1)
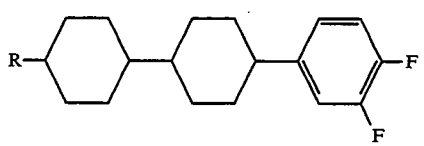 (C2)
 (C3)
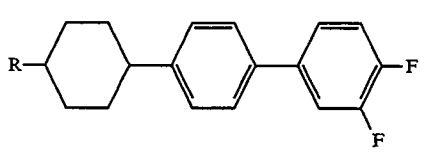 (C4)
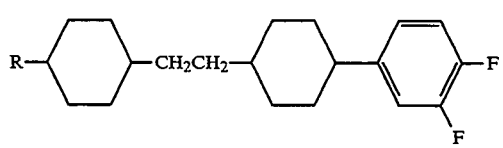 (C5)
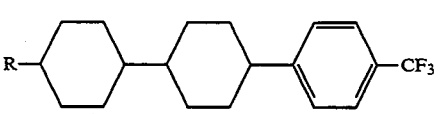 (C6)
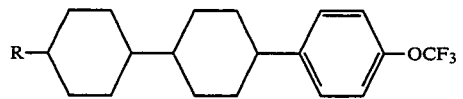 (C7)
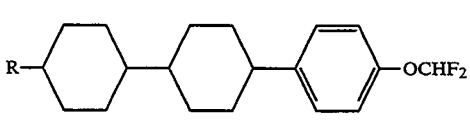 (C8)
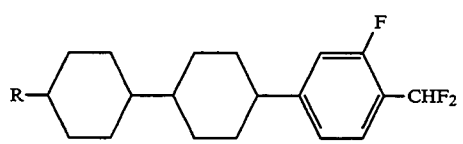 (C9)
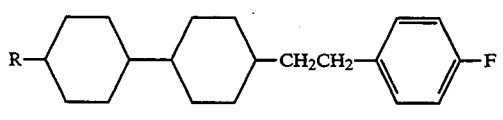 (C10)
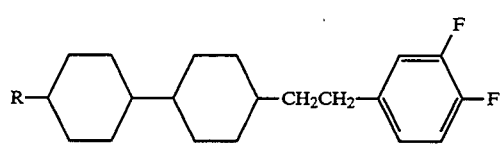 (C11)
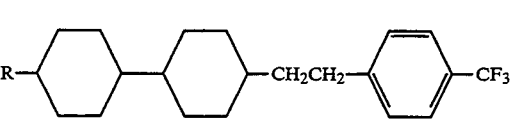 (C12)

-continued
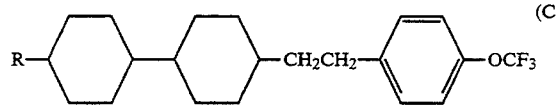 (C13)
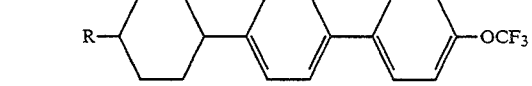 (C14)
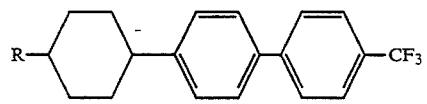 (C15)
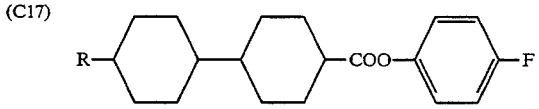 (C16)
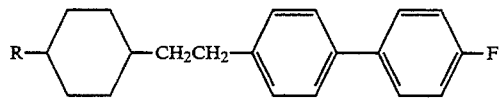 (C17)
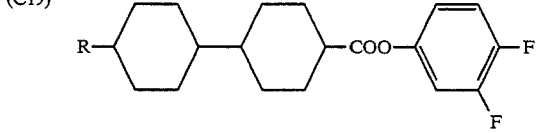 (C18)
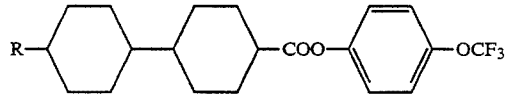 (C19)
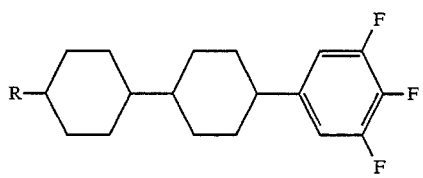 (C20)
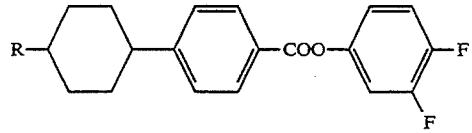 (C21)
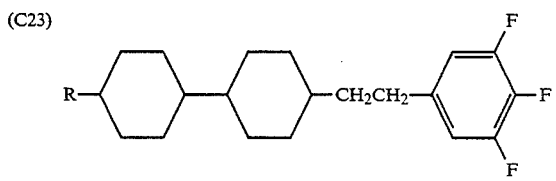 (C22)
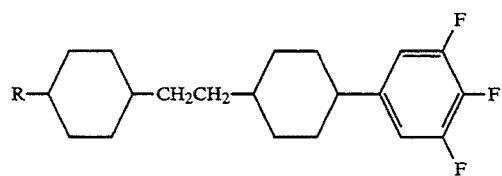 (C23)
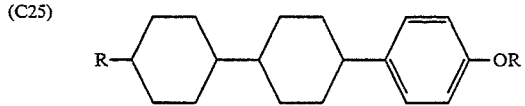 (C24)
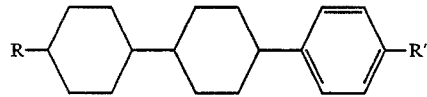 (C25)
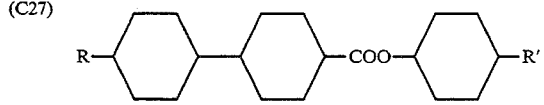 (C26)
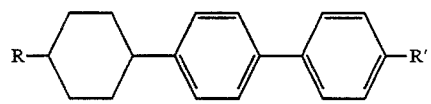 (C27)
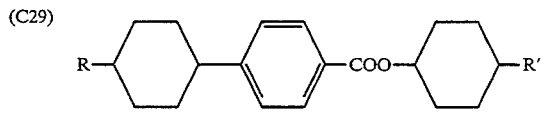 (C28)
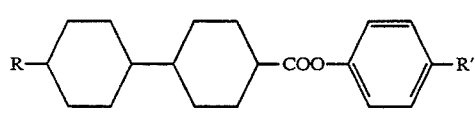 (C29)
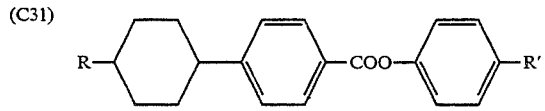 (C30)
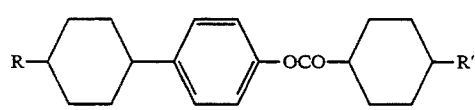 (C31)
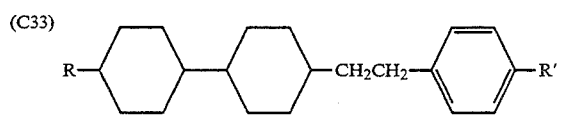 (C32)
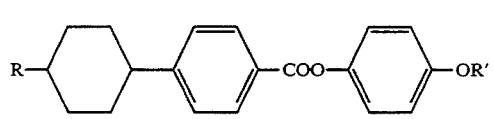 (C33)
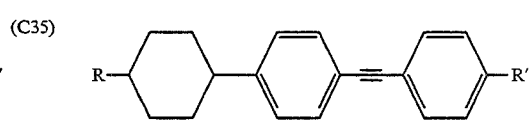 (C34)
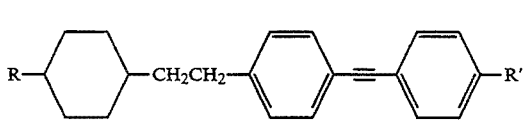 (C35)
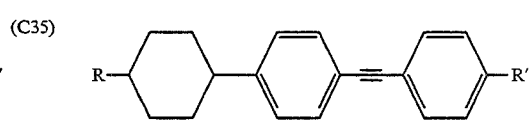 (C36)

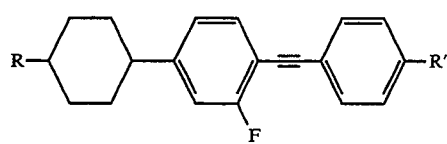 (C37)
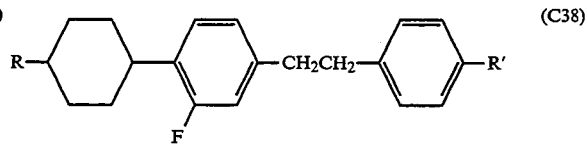 (C38)
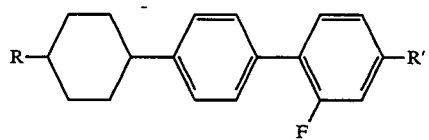 (C39)
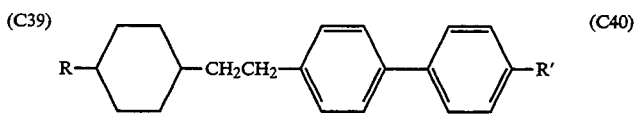 (C40)
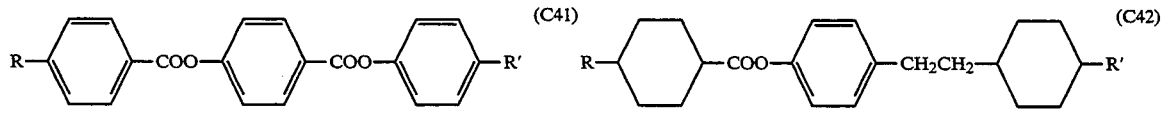 (C41)
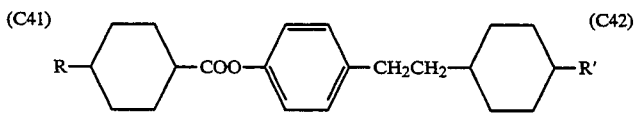 (C42)
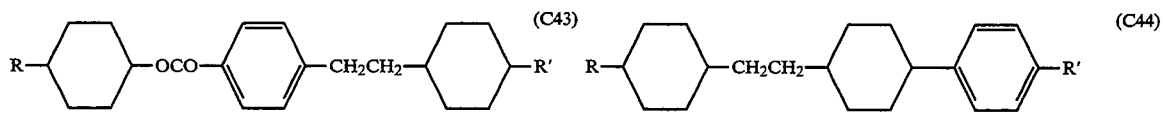 (C43)
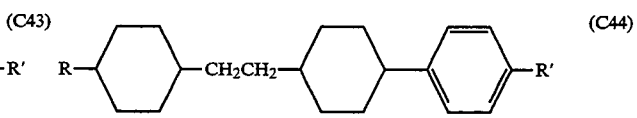 (C44)
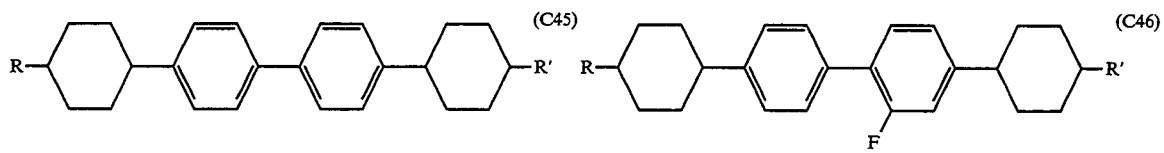 (C45)
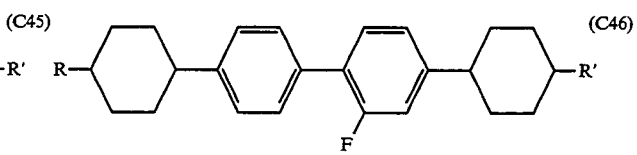 (C46)
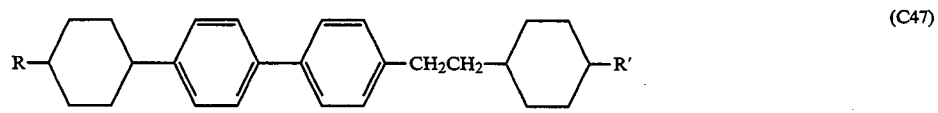 (C47)
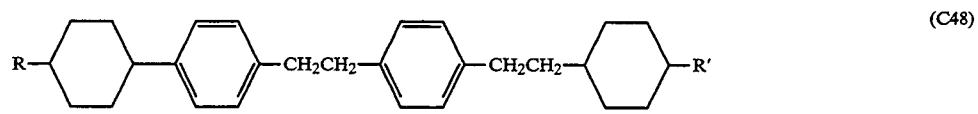 (C48)
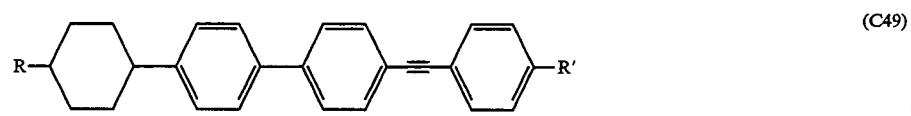 (C49)
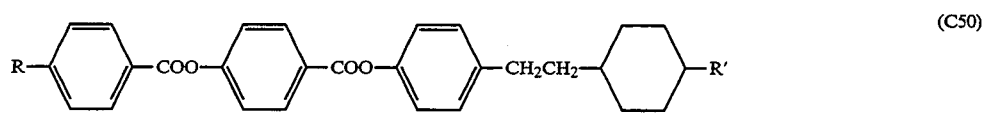 (C50)
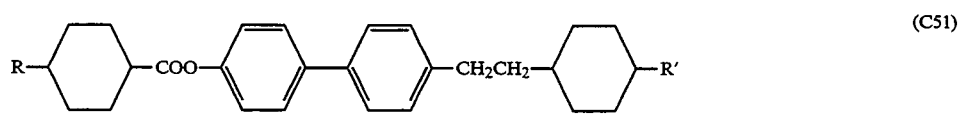 (C51)
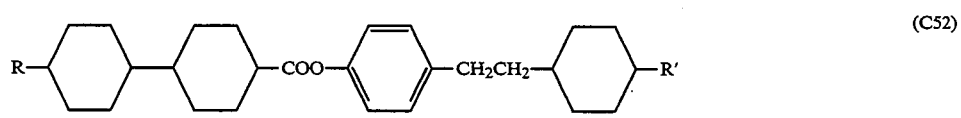 (C52)
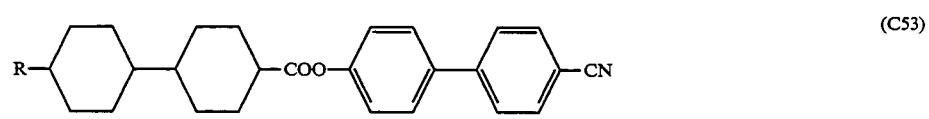 (C53)
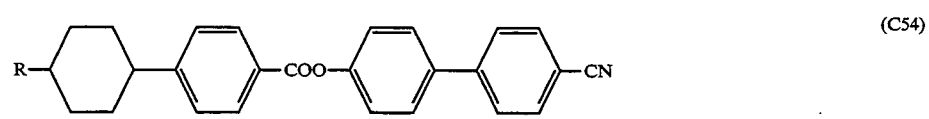 (C54)

-continued
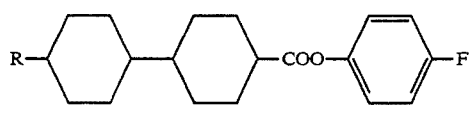 (C55)
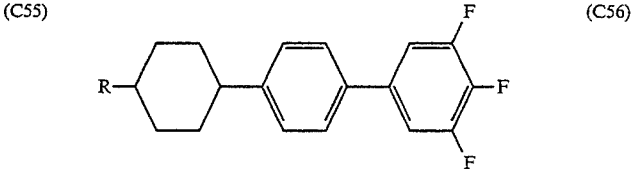 (C56)
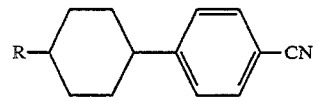 (D1)
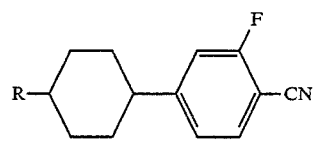 (D2)
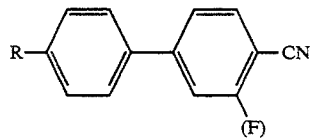 (D3)
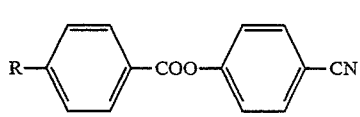 (D4)
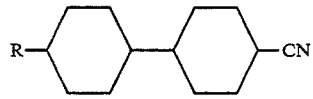 (D5)
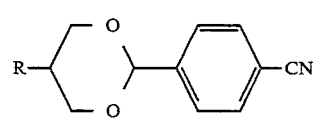 (D6)
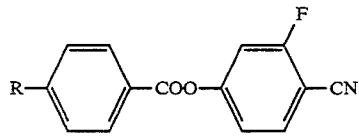 (D7)
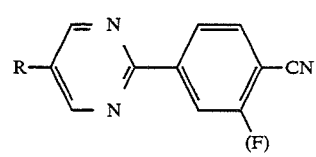 (D8)
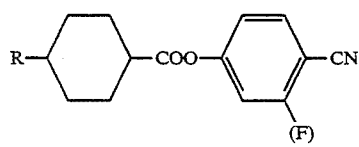 (D9)
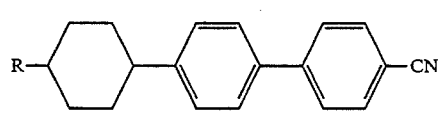 (D10)
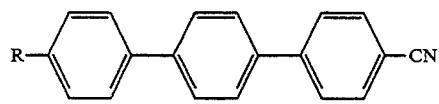 (D11)
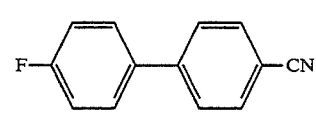 (D12)
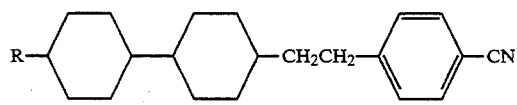 (D13)
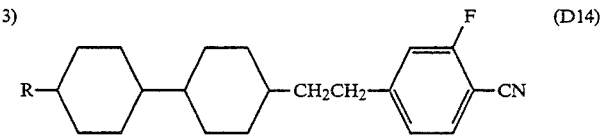 (D14)
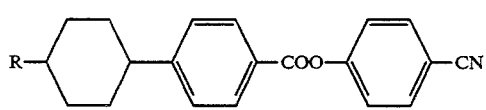 (D15)
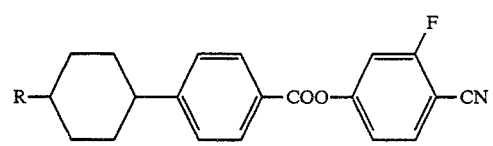 (D16)
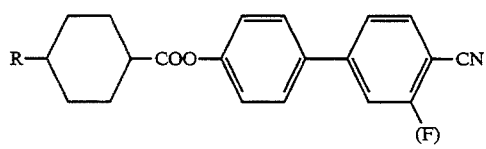 (D17)
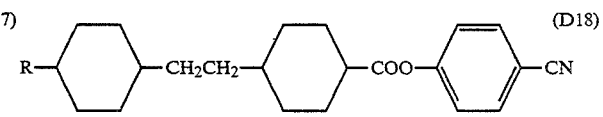 (D18)
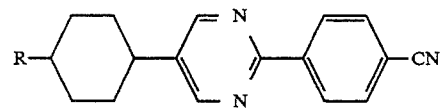 (D19)
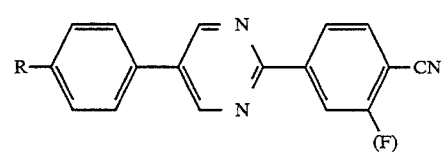 (D20)

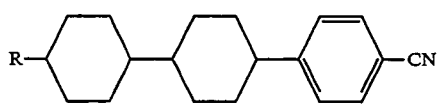
(D21)

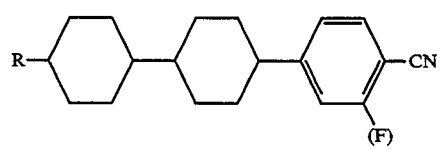
(D22)

Further, as the ferroelectric liquid crystal substances used for the liquid crystal display element of the present invention, (E) liquid crystal compounds containing a chiral component in the molecular skelton, and (F) liquid crystal compounds containing no chiral component are usable. These compounds are adequately selected from among (E) and (F), mixed and used, while adjusting a-mesomorphic range, phase series, values of spontaneous polarization, viscosity, etc., depending upon the properties required for the liquid crystal display element.

Compounds belonging to (E) are exemplified below, but the present invention should not be construed to be limited thereto. In the formulas, n represent an integer of 4 to 16, m represents an integer of 2 to 10, L represents an integer of 0 to 8, and p represents an integer of 1 to 8.

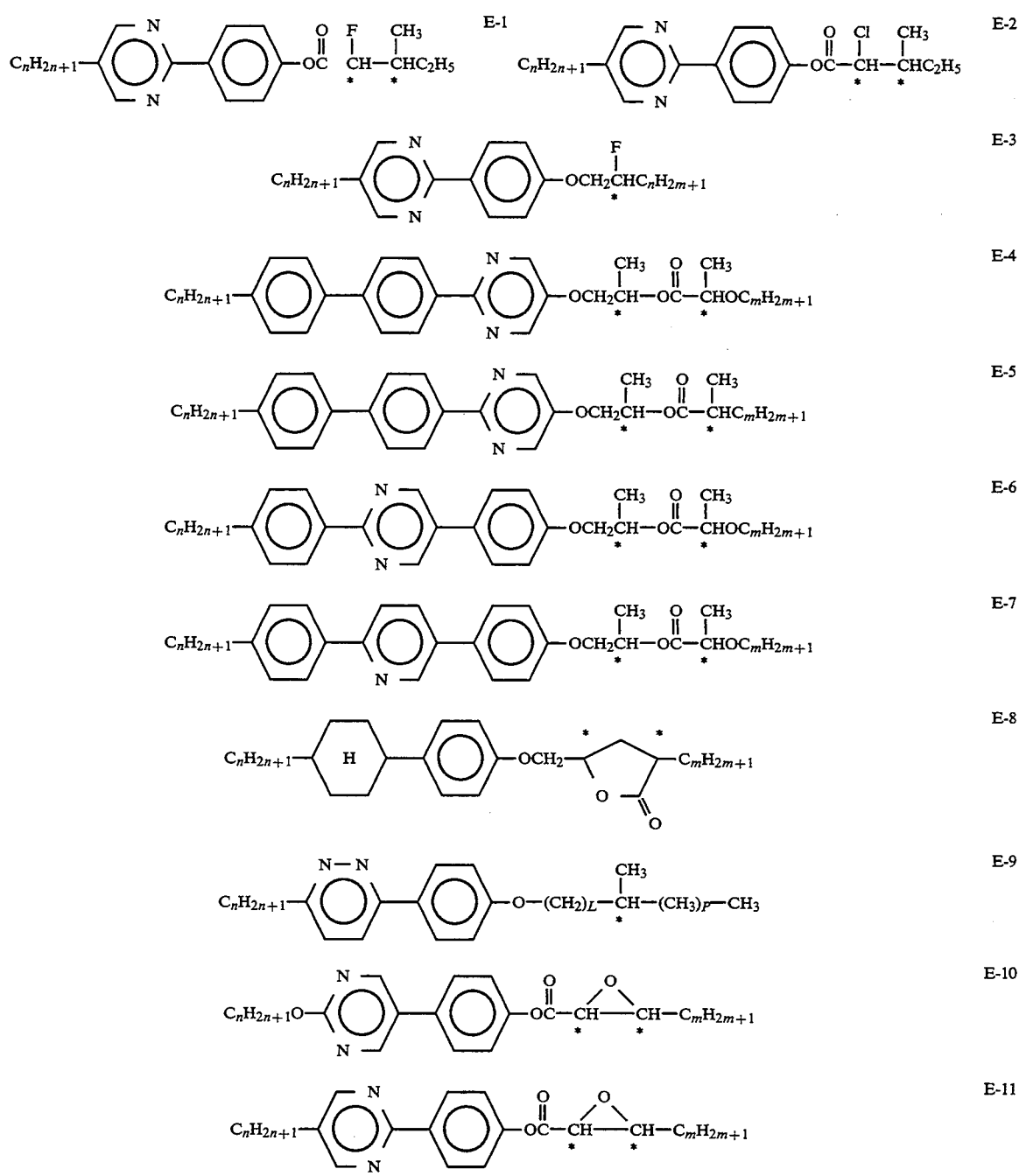

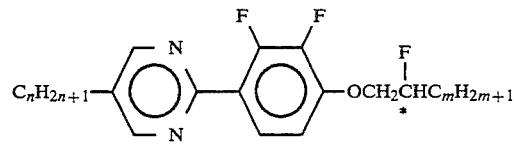
E-12
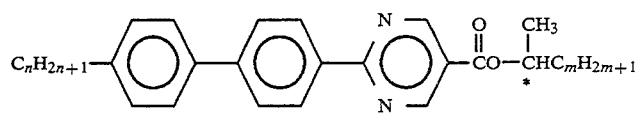
E-13
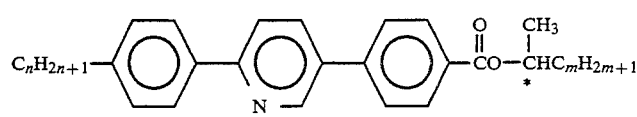
E-14
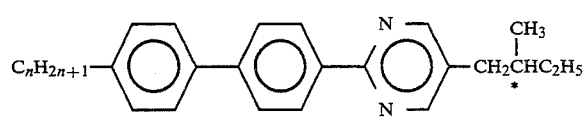
E-15
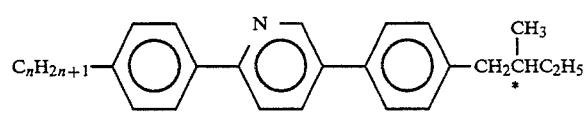
E-16
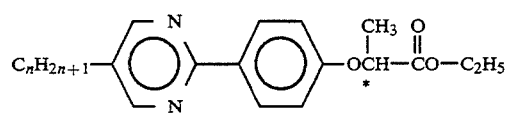
E-17
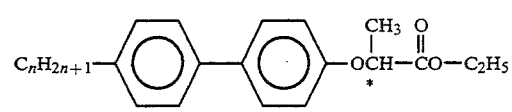
E-18
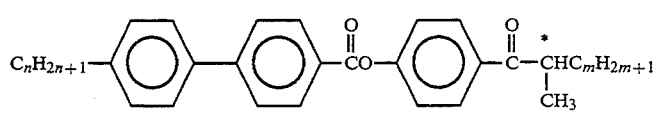
E-19
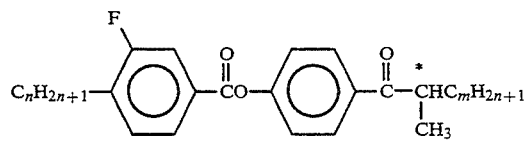
E-20
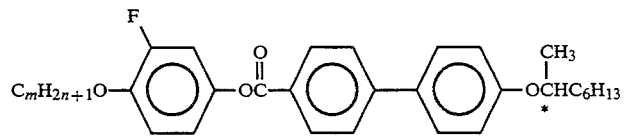
E-21
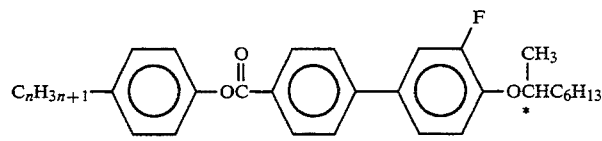
E-22
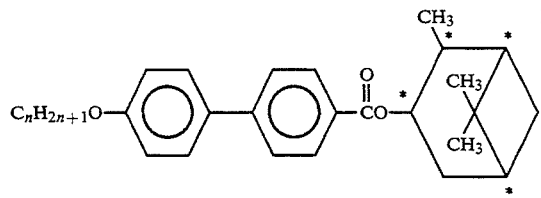
E-23
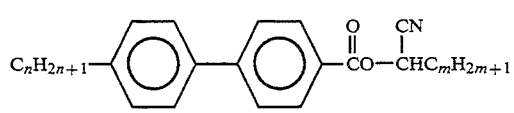
E-24

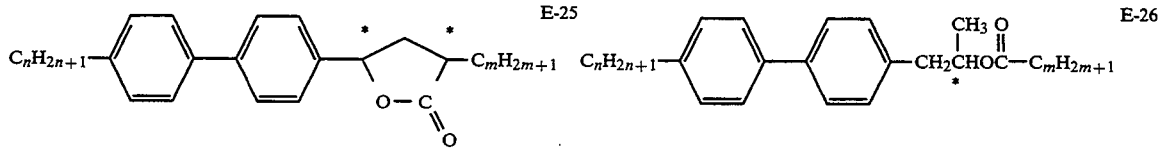
E-25
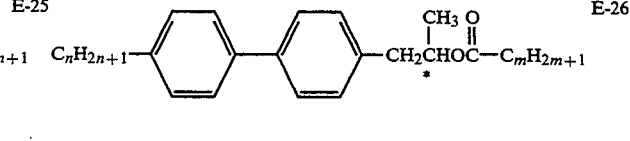
E-26
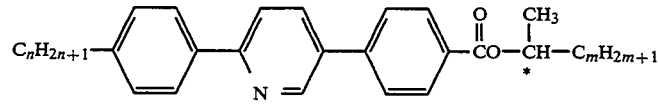
E-27
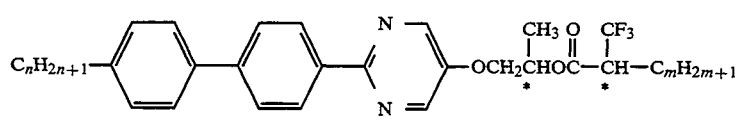
E-28
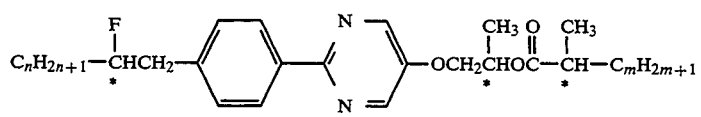
E-29
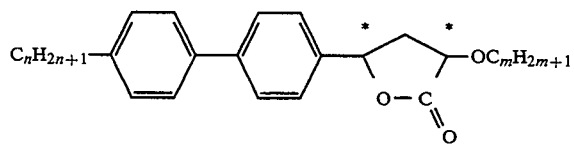
E-30
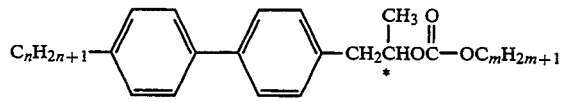
E-31
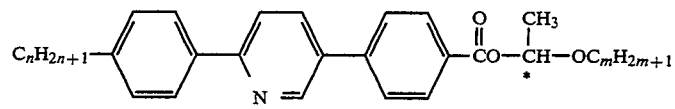
E-32
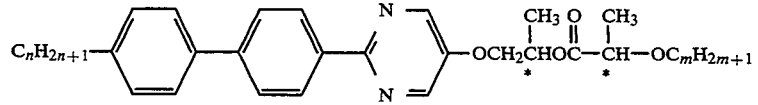
E-33
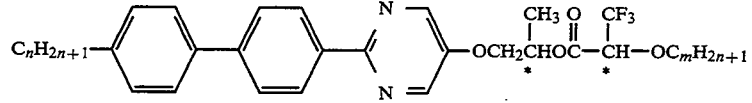
E-34
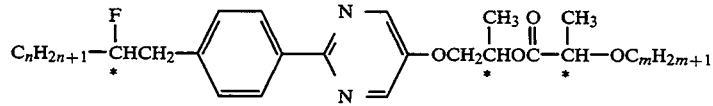
E-35
Compounds belonging to (F) are exemplified below, but the present invention should not be construed to be limited thereto. In the formulas, n and m each independently represent an integer of 4 to 16.
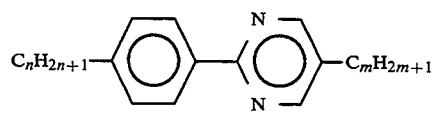
F-1
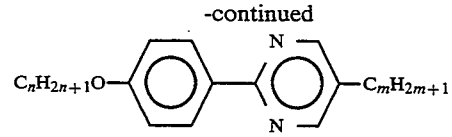
F-2
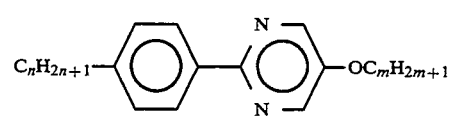
F-3

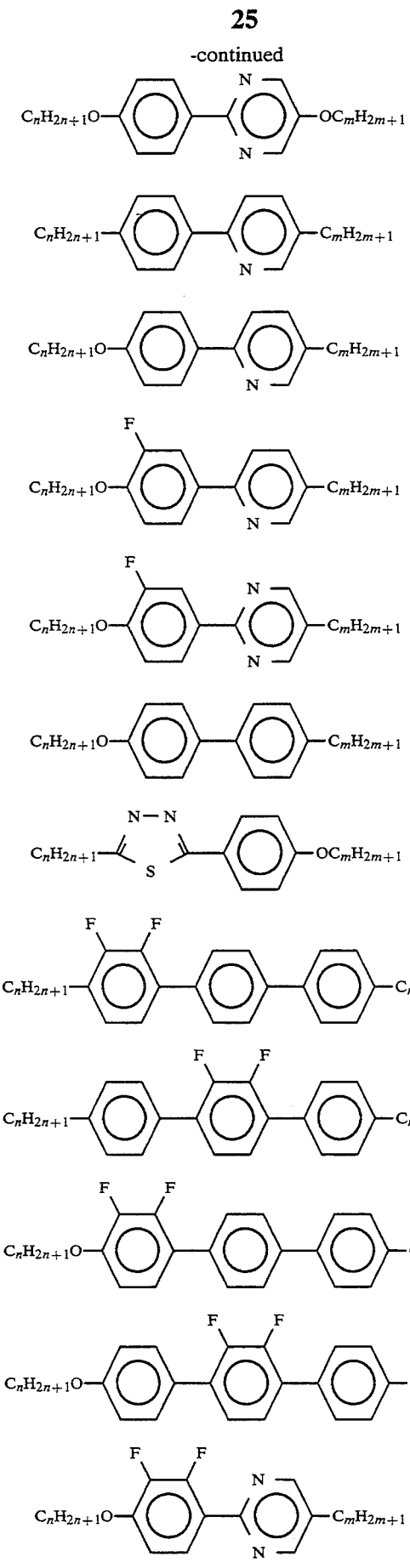
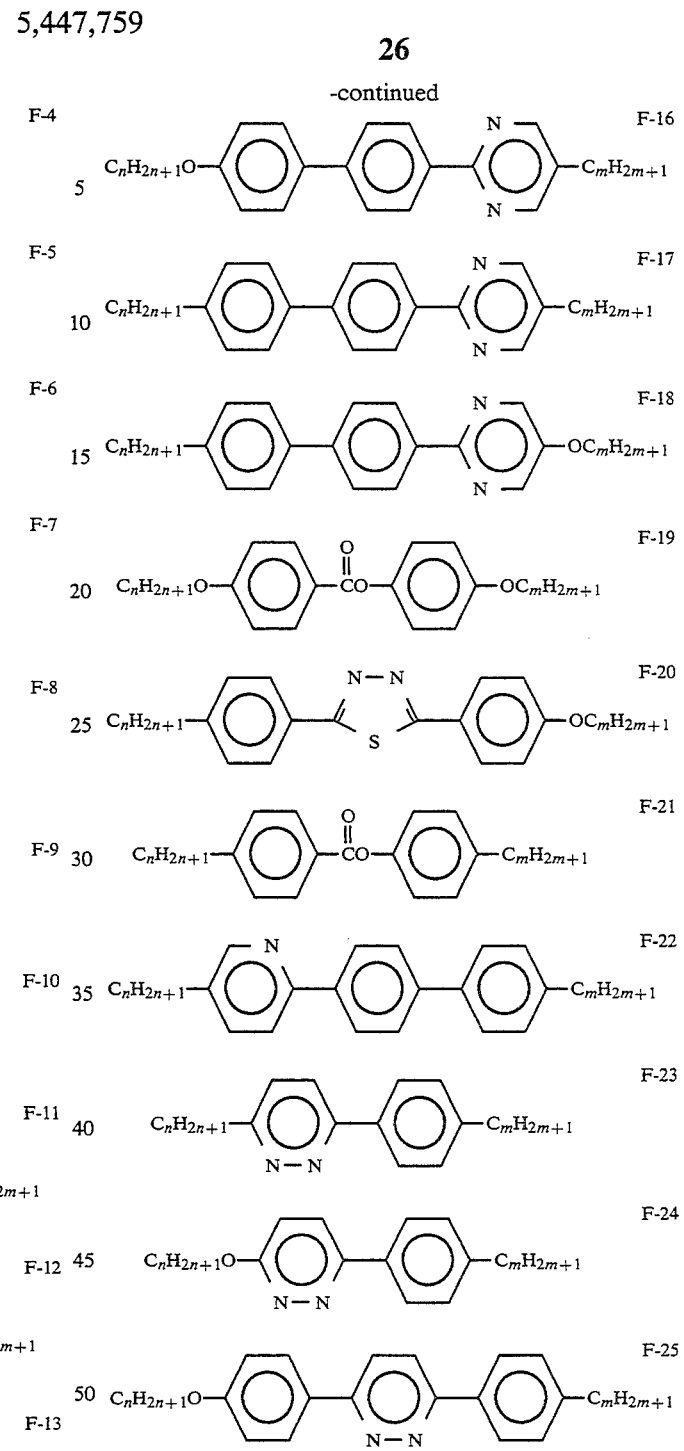

The liquid crystal alignment film obtained according to the above process solves the problem of the phenomena of afterimage and stationary image causing to notably deteriorated the display quality, and when the film is used as an alignment film for ferroelectric liquid crystals, it has a characteristic of exhibiting a good memory characteristic.

Further, the liquid crystal display element of the present invention is composed according to a conventional method, using a substrate, a transparent electrode, a voltage-impressing means, a liquid crystal alignment film, a liquid crystal material, etc., except that an alignment film provided with the above characteristic is used.

EXAMPLES

The present invention will be described in more detail by way of Examples, but it should not be construed to be limited thereto.

In the respective Examples and Comparative examples, the extent of the afterimage was evaluated by the hysterisis range (V) measured according to C-V curve method. According to this C-V curve method, when a triangular wave of voltage V=±10 V (frequency: 0.0036 Hz) was applied onto a liquid crystal cell containing a nematic liquid crystal substance having a positive dielectric anisotropy value, and this was superimposed with an alternate current voltage of 25 mV and 1 KHz, and swept, then the capacity C changed at that time is recorded. The C-V curve after several cycles is obtained as seen in FIG. 1, for example. When a deviation of the charge occurs on the interface between the liquid crystal substance and the alignment film, and when such a state has been stabilized, a C-V curve having a hysterisis on both of the positive side and the negative side of the applied voltages is obtained. Namely, it can be said that the value of the hysterisis in the aspect of C-V characteristic becomes a parameter of the extent of the charge accumulation on the interface between the liquid crystal layer and the aligned film; thus, ideally, it is desired that the hysterisis is zero.

Herein, the value of the hysterisis is determined by drawing a tangent line at the turning point of the C-V curve, seeking for cross-points ($\alpha 1$ to $\alpha 4$) with X axis (voltage axis) and seeking for the potential differences between the respective two points on the positive side and the negative side. As to this value, between the display elements having common values of the cell gap of and the thickness of the alignment film, the value can be employed as the parameter of the charge accumulation. The nearer the hysterisis value to zero, the smaller the charge accumulation on the interface between the liquid crystal and the alignment film and also the less the extent of the afterimage.

Figure 2:
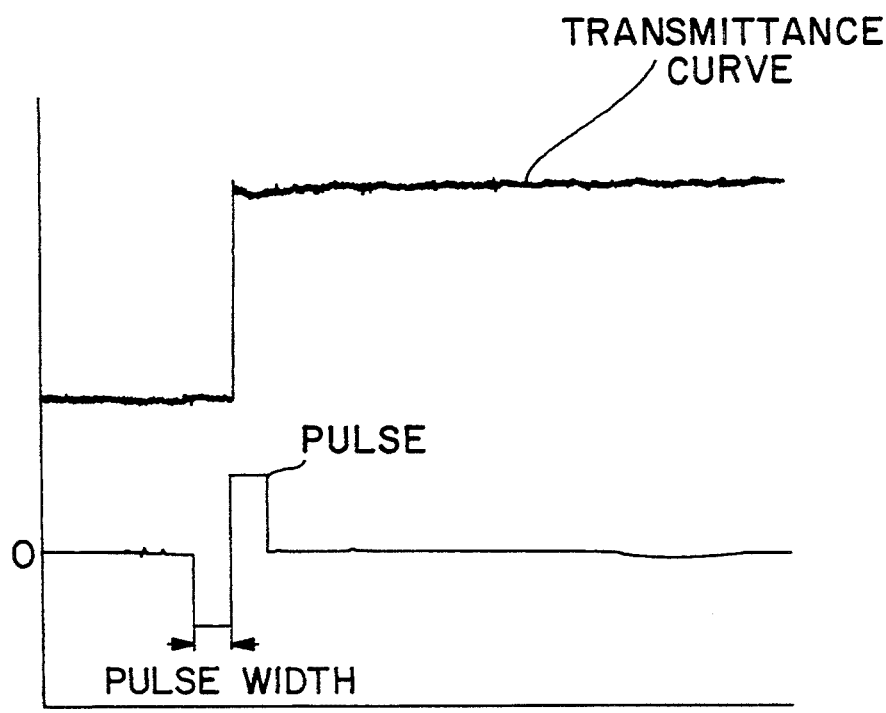
FIG. 2 shows a view illustrating a wave form of optical response of a ferroelectric liquid crystal display cell.

Further, as to the evaluation of memory properties in the ferroelectric liquid crystal display device, the dipolar pulse of 10 V voltage per a cell thickness of 1 μm was applied while varying the pulse width, to examine the wave form of the optical response, and a pulse width affording a memory state where the area of the display element became 90% or more was sought. FIG. 2 illustrates an example of such a wave form of optical response. Such a pulse width is preferred to be shorter, and if the memory characteristic is good, it is possible to obtain a memory state even when the pulse width is short.

EXAMPLE 1

Into a 1 l four-necked flask provided with a stirrer, a thermometer, a condenser and a nitrogen gas-purging means, were fed dehydrated and purified N-methyl-2-pyrrolidone (200 g) and 1,1-bis[4-(4-aminophenoxy)-phenyl]4-ethylcyclohexane (27.1 g), followed by dissolving them with stirring, cooling the solution down to 20° C., feeding-pyromellitic dianhydride (12.1 g) at a time, reacting under cooling and with stirring for 2 hours, adding p-aminophenyltrimethoxysilane (0.3 g), reacting at room temperature for 3 hours with stirring, and adding to the reaction solution, N-methyl-2-pyrrolidone (133.3 g) and butyl cellosolve (285.5 g), for dilution, to obtain a transparent solution of polyamic acid (6% by weight). The viscosity at 25° C. of this solution (measured using a viscometer E type made by Tokyo Keiki Co., Ltd. and at a temperature of 25°±0.1° C.) was 50 centipoises.

From this solution were prepared two kinds of sample solutions having 10 and 15% by weight of phenothiazine based upon the resin solids added, followed by coating the respective solutions onto a transparent glass substrate provided with ITO transparent electrode according to printing method, heat-drying on a hot plate, heat-treating at 200° C., to obtain an electrode substrate having a polyimide film of about 60 nm thick formed thereon, rubbing the polyimide surfaces of two sheets of the electrode substrates at a specified subbing strength so that the respective rubbing directions might be in counter-parallel on the respective upper and lower substrates, to compose a liquid crystal cell having a cell gap of 6 μm, and filling a nematic liquid crystal mixture therein. This liquid crystal mixture was composed of the following components and had an N-I point of 75° C. and a Δn of 0.1400:

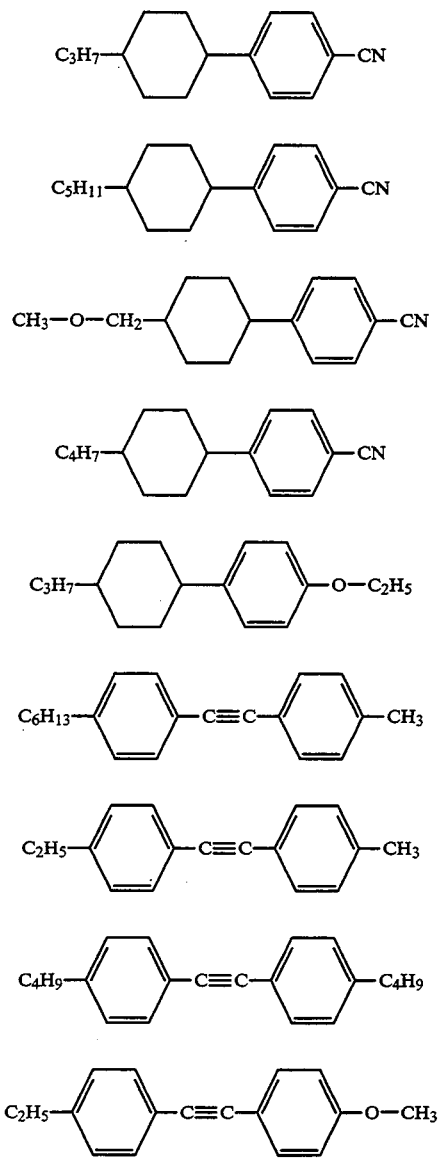

-continued

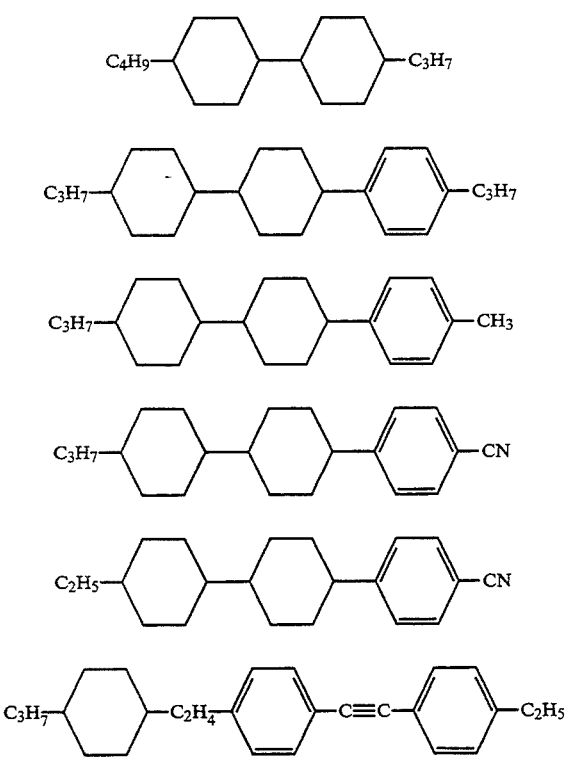

After filling, the resulting cell was heated up to 120° C. and gradually cooled to obtain a liquid crystal display element. No alignment unevenness was observed on the display surface of the element, and its alignment was good. Using this liquid crystal display element, the hysterisis ranges (V) by way of C-V curve at room temperature and 60° C. were measured. The results are shown in Table 1.

TABLE 1

| Quantity of phenothiazine added (%) | Hysterisis (V) (room temperature) | Hysterisis (V) (60° C.) |
| --- | --- | --- |
| 10 | 3.7 | 2.9 |
| 15 | 2.7 | 2.0 |

Example 2

To the transparent solution of 6% by weight of the polyamic acid obtained in Example 1, were added 10, 15 and 20% by weight of diphenylbenzidine (DPBZ) based upon the weight of the resin solids, respectively, to prepare three kinds of sample solutions, followed by coating the respective solution onto a glass substrate provided with ITO transparent electrode, according to printing method, heat-drying the resulting material on a hot plate, and heat-treating in an oven at 200° C., to obtain a polyimide film having a coating thickness of about 60 nm. A liquid crystal cell was composed in the same manner as in Example 1, filled with a liquid crystal mixture, heated up to 120° C. and gradually cooled, to obtain a liquid crystal display element.

The alignment of this liquid crystal display element was good. Using this liquid crystal display element, the hysterisis ranges (V) according to C-V curve at room temperature and at 60° C. were measured. The results are shown in Table 2.

TABLE 2

| Quantity of DPBZ added (%) | Hysterisis (V) (room temperature) | Hysterisis (V) (60° C.) |
| --- | --- | --- |
| 10 | 4.1 | 4.1 |
| 15 | 3.2 | 3.0 |
| 20 | 2.5 | 1.8 |

Example 3

Into a 1 l hour-necked flask provided with a stirrer, a thermometer, a condenser and a nitrogen gas-purging equipment were fed dehydrated and purified N-methyl-2-pyrrolidone (200 g) and then 1,1-bis[4-(4-aminophenoxy)-phenyl]-4-ethylcyclohexane (27.1 g), followed by dissolving them with stirring, cooling the solution down to 20° C., feeding pyromellitic dianhydride (12.1 g) at a time, reacting them under cooling and with stirring for 2 hours, adding p-aminophenyltrimethoxysilane (0.3 g) and phenothiazine (3.9 g or 5.9 g), reacting them at room temperature for 3 hours with stirring, and then diluting the reaction solution with N-methyl-2-pyrrolidone (133.3 g) and butyl cellosolve (285.5 g), to obtain a transparent solution of a polyamic acid (6% by weight). This solution had a viscosity at 25° C. of 55 centipoises when measured at 25°±0.1° C. using a E type viscometer made by Tokyo Keiki Co., Ltd. This solution was coated onto a transparent glass substrate provided with ITO transparent electrode, heat-drying on a hot plate, and heat-treating at 200° C., to obtain a polyimide film having a coating thickness of about 60 nm. The coated surfaces of two substrates having the polyimide film formed thereon were rubbed at a definite strength so that the respective rubbing directions could be in counter-parallel on the upper and lower substrates. A liquid crystal cell having a cell gap of 6 μm was composed, filled with the same nematic liquid crystal mixture as used in Example 1, and gradually cooled, to obtain a liquid crystal display element.

The alignment of these liquid crystal elements was good. Using the liquid crystal display elements, the hysterisis ranges by way of C-V curve at room temperature and 60° C. were measured. The results are shown in Table 3.

TABLE 3

| Quantity of phenothiazine used (g) | Hysterisis (V) (room temperature) | Hysterisis (V) (60° C.) |
| --- | --- | --- |
| 3.9 | 4.0 | 3.2 |
| 5.9 | 2.7 | 2.1 |

Example 4

Example 3 was repeated except that phenothiazine was replaced by DPBZ, to obtain a liquid crystal display element.

The alignment of these liquid crystal display elements was good. Using the liquid crystal elements, the hysterisis ranges by way of C-V curve at room temperature and 60° C. were measured. The results are shown in Table 4.

TABLE 4

| Quantity of DPBZ used (g) | Room temperature (V) | 60° C. (V) |
| --- | --- | --- |
| 3.9 | 4.0 | 4.2 |
| 5.9 | 3.2 | 2.9 |

TABLE 4-continued

| Quantity of DPBZ used (g) | Room temperature (V) | 60° C. (V) |
| --- | --- | --- |
| 7.9 | 2.1 | 1.8 |

Example 5

Example 3 was repeated except that phenothiazine was replaced by N-phenyl-phenylenediamine (N-PPD), to obtain liquid crystal display elements.

The alignment of these liquid crystal display elements was good. Using the liquid crystal display elements, the hysterisis widths by way of C-V curve at room temperature and 60° C. was measured. The results are shown in Table 5.

TABLE 5

| Quantity of N-PPD used (g) | Room temperature (V) | 60° C. (V) |
| --- | --- | --- |
| 3.9 | 5.2 | 5.6 |
| 5.9 | 4.1 | 4.5 |
| 7.9 | 3.2 | 3.0 |

Example 6

A polyimide film of about 60 nm was formed in the same manner as in Example 1, followed by rubbing it at a definite strength so that the rubbing directions could be in parallel on the upper and lower substrates, to compose a liquid crystal cell having a cell gap of 2.0 μm. A ferroelectric liquid crystal mixture was filled in the cell.

The liquid crystal mixture was composed of the following components and had the following characteristics:

Cr −5° C. Sc* 70° C. Sa 75° C. N* 88° C. Iso
Ps (25° C.)=20.2 (nC/cm$^2$)
tilt angle (25° C.)=28.4°

Herein, Cr: crystalline phase, Sc*: chiral smectic phase, Sa: smectic A phase, N*: cholesteric phase, Iso: isotropic liquid phase, and Ps: spontaneous polarization value.

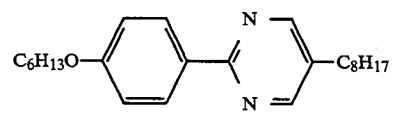

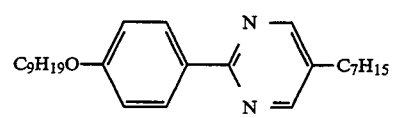

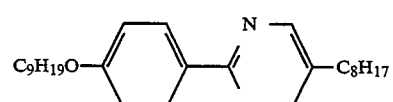

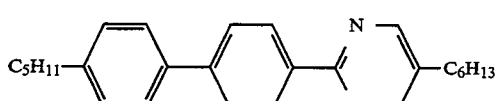

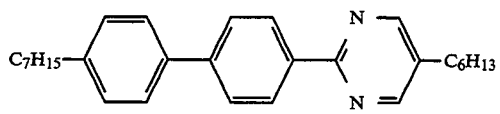

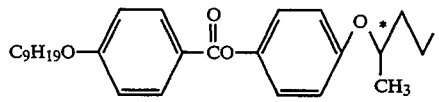

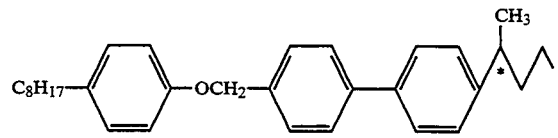

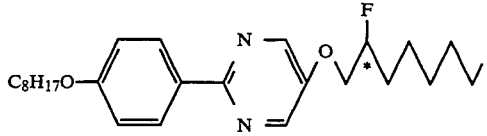

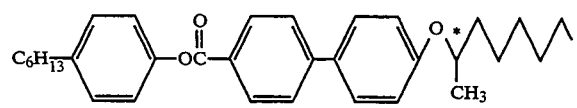

The alignment of the resulting liquid crystal display elements was C2 uniform alignment. The least memory pulse width in this liquid crystal display element was 60 μ sec.

Comparative Example 1

Example 1 was repeated except that phenothiazine was not added, to prepare a liquid crystal display element.

The alignment of this liquid crystal element was good. Using this liquid crystal display element, the hysterisis ranges by way of C-V curve at room temperature and 60° C. were measured. The results are shown in Table 6.

TABLE 6

| Hysterisis (V) (room temperature) | Hysterisis (V) (60° C.) |
| --- | --- |
| 5.1 | 7.5 |

Comparative Example 2

Example 6 was repeated except that phenothiazine was not added, to prepare a liquid crystal display element using the ferroelectric liquid crystal mixture. The alignment of the resulting liquid crystal display element was C2 uniform alignment. However, in the case of this liquid crystal display element, even if the memory pulse width was increased as far as 1 msec, it was impossible to obtain a memory state, to exhibit a metastable state.

Effectiveness of the Invention

According to the present invention, when a compound having the formula (2) or (3) is contained in a specified quantity in a polyimide constituting a liquid crystal alignment film, then it is possible to obtain an alignment film and a liquid crystal display element having a good alignment and having reduced a phenomenon of afterimage. Further, when the alignment film of the present invention is used for a liquid crystal display element using ferroelectric liquid crystal substances, it is possible to obtain a good memory state.

What is claimed is:

1. A liquid crystal alignment film composed of a polyimide expressed by the following formula (1) and coated onto a substrate provided with a transparent electrode, which film contains a compound expressed by the following formula (2) or (3) in a quantity of 0.01 to 20% by weight based upon the weight of the polyimide:

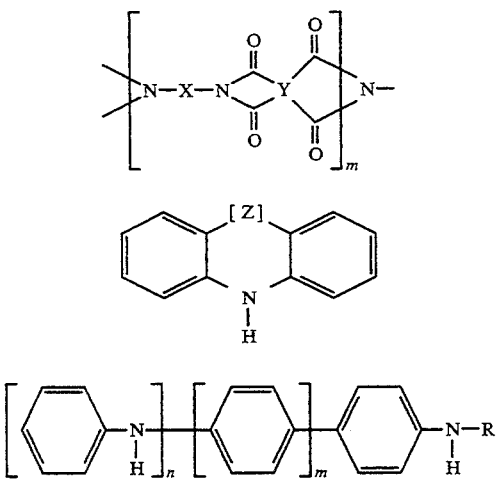

wherein X represents a divalent aromatic group or a divalent aliphatic group; Y represents a tetravalent aromatic group or alicyclic group; Z represents —S—, —O— or =NH; R represents a phenyl group, a benzyl group or an alkyl group; and m and n each represent 0 or 1.

2. A liquid crystal alignment film according to claim 1, wherein said polyimide is obtained by coating a polyamic acid containing a compound expressed by the formula (2) or (3) in a quantity of 0.01 to 20% by weight onto a substrate provided with a transparent electrode, followed by heating the resulting material.

3. A liquid crystal alignment film according to claim 1, wherein said polyimide of the formula (1) is obtained by coating a solution containing a compound expressed by the formula (2) or (3) in a quantity of 0.01 to 20% by weight based upon the weight of said polyimide onto a substrate provided with a transparent electrode, followed by heating the resulting material.

4. A liquid crystal alignment film according to claim 1, wherein a compound expressed by the formula (2) or (3) is copolymerized within the polyimide of the formula (1) in a quantity of 0.01 to 20% by weight based upon the weight of said polyimide.

5. A liquid crystal alignment film according to any one of claims 1 to 4, wherein said compound expressed by the formula (2) is phenothiazine, phenoxazine or 5,10-dihydrophenazine.

6. A liquid crystal alignment film according to any one of claims 1 to 4, wherein said compound expressed by the formula (3) is diphenylbenzidine, diphenylamine, N-phenylphenylenediamine or phenylbenzylamine.

7. A liquid crystal display element comprising a liquid crystal alignment film according to claim 1.

8. A liquid crystal display element according to claim 7, wherein a liquid crystal material used therein is a nematic liquid crystal mixture having a positive dielectric anisotropy.

9. A liquid crystal display element according to claim 7, wherein a liquid crystal material used therein is a ferroelectric liquid crystal mixture.

10. A liquid crystal display element according to claim 9, wherein said ferroelectric liquid crystal mixture has a spontaneous polarization value of 3 to 40 nC/cm$^2$.

* * * * *